(12) United States Patent
Castelli Dezza et al.

(10) Patent No.: US 8,174,138 B2
(45) Date of Patent: May 8, 2012

(54) MODULAR CONVERTER FOR CONVERTING THE ELECTRIC POWER PRODUCED BY AEROGENERATORS, AND WIND-POWER PLANT THAT USES SAID CONVERTER

(75) Inventors: Francesco Castelli Dezza, Cesena (IT); Fabio Pallotti, Cesena (IT); Gabriele Marghegiani, Cesena (IT)

(73) Assignee: Trevi Energy S.p.A., Cesena (FC) (IT)

( * ) Notice: Subject to any disclaimer, the term of this patent is extended or adjusted under 35 U.S.C. 154(b) by 264 days.

(21) Appl. No.: 12/431,507

(22) Filed: Apr. 28, 2009

(65) Prior Publication Data
US 2009/0273956 A1 Nov. 5, 2009

(30) Foreign Application Priority Data
Apr. 30, 2008 (IT) ............................. TO2008A0324

(51) Int. Cl.
*F03B 13/00* (2006.01)
*F03B 13/10* (2006.01)
*F03B 13/12* (2006.01)
(52) U.S. Cl. ............... 290/44; 290/42; 290/43; 290/53; 290/54; 290/55
(58) Field of Classification Search .................. 290/44, 290/55, 43, 42, 53, 54; F03B 13/00, 13/10, F03B 13/12
See application file for complete search history.

(56) References Cited

U.S. PATENT DOCUMENTS

| 4,941,079 | A | 7/1990 | Oooi | |
|---|---|---|---|---|
| 6,680,856 | B2 | 1/2004 | Schreiber | |
| 6,801,019 | B2* | 10/2004 | Haydock et al. | 322/17 |
| 7,239,036 | B2* | 7/2007 | D'Atre et al. | 290/44 |
| 7,439,714 | B2* | 10/2008 | Llorente Gonzalez et al. | 322/24 |
| 7,755,209 | B2* | 7/2010 | Jones et al. | 290/44 |
| 2003/0168864 | A1* | 9/2003 | Heronemus et al. | 290/55 |
| 2005/0200337 | A1* | 9/2005 | Schreiber et al. | 323/205 |
| 2006/0192390 | A1* | 8/2006 | Juanarena Saragueta et al. | 290/44 |
| 2006/0249957 | A1* | 11/2006 | Ito et al. | 290/44 |
| 2007/0116572 | A1* | 5/2007 | Barbu et al. | 416/132 B |

(Continued)

FOREIGN PATENT DOCUMENTS
EP 1 244 203 9/2002
(Continued)

OTHER PUBLICATIONS

Mwinyiwiwa et al. "Microprocessor Implemented SPWM for Multiconverters with Phase-Shifted Triangle Carriers." *IEEE.* vol. 2. 19997. pp. 1542-1549.

(Continued)

*Primary Examiner* — Quyen Leung
*Assistant Examiner* — Terrance Kenerly
(74) *Attorney, Agent, or Firm* — Merchant & Gould P.C.

(57) ABSTRACT

A modular converter 30 for converting the electric power produced by aerogenerators, designed to be used within a wind-power plant, which is equipped with: input terminals 30a designed to be connected to an electric-power generator 3 of a single-phase or multiphase type; output terminals 30b; and control devices 36 for controlling the power of the electric-power generator 3. The modular converter has multiple modules 31 designed to receive on their inputs 31.1 alternating electric current and to produce on the respective outputs 31.2a, 31.2b direct electric current to be distributed within the wind-power plant, and, moreover, the control devices 36 receive a signal from the modules 31 and act on the electric-power generator 3.

14 Claims, 6 Drawing Sheets

U.S. PATENT DOCUMENTS

2007/0273155 A1* 11/2007 Barton et al. .................. 290/44
2008/0007973 A1   1/2008 Schreiber
2008/0093855 A1*  4/2008 Walling ......................... 290/44

FOREIGN PATENT DOCUMENTS

| EP | 1 416 604 | 5/2004 |
|---|---|---|
| EP | 1 796 254 | 11/2006 |
| EP | 1 876 696 | 1/2008 |
| WO | WO 97/45908 | 12/1997 |
| WO | WO 01/52379 | 7/2001 |

OTHER PUBLICATIONS

Qiu et al. "Study and Design of Grid Connected Inverter for 2 MW Wind Turbine." *IEEE*. 2007. pp. 165-170.

* cited by examiner

MODULAR CONVERTER FOR CONVERTING THE ELECTRIC POWER PRODUCED BY AEROGENERATORS, AND WIND-POWER PLANT THAT USES SAID CONVERTER

This application is claims benefit of Serial No. TO2008A00324, filed 30 Apr. 2008 in Italy and which application(s) are incorporated herein by reference. To the extent appropriate, a claim of priority is made to each of the above disclosed applications.

BACKGROUND OF THE INVENTION

The present invention relates to a system of energy conversion for aerogenerators, and in particular regards a modular converter for converting the electric power produced by aerogenerators, as well as to the corresponding wind-power plant that uses it.

In order to enable a clearer understanding of the ensuing description, provided hereinafter is the complete list of the acronyms used in the text:

a.c.—alternating current;
d.c.—direct current;
DCBUS—direct-current intermediate circuit;
LV—low voltage;
MV—medium voltage;
HV—high voltage;
HVDC—high voltage direct current, high-voltage and direct-current transmission;
DDPMSG—direct-drive permanent-magnet synchronous generator;
DFIG—doubly-fed induction generator;
IGBT—insulated-gate bipolar transistor;
MMSC—multilevel modular static converter;
SCM—static converter module;
DC—digital controller;
MDC—master digital controller;
SDC—slave digital controller;
$N_m$—number of SCMs;
$N_{ms}$—number of SCMs in series;
$N_{mp}$—number of SCMs in parallel;
$V_{mac}$—a.c. voltage on input side of SCM;
$V_{mdc}$—d.c. voltage on output side of SCM;
$V_{dcn}$—total d.c. voltage of the d.c. intermediate circuit.

SUMMARY OF THE INVENTION

The present development of wind turbines for the production of electric current, also known by the term "aerogenerators" envisages increasingly high levels of power; in particular, this is true for offshore wind-power plants, i.e., those plants installed at some miles from the sea coast or from the banks of lakes in order to use to greater effect their marked exposure to the currents of air in these areas.

As illustrated in FIG. 1, the aerogenerators 1 comprise wind turbines 2 equipped with blades 2a and systems with gears 2b, 2c contained within a body 4 mounted on a supporting pylon 5. The aerogenerators 1 moreover comprise, once again within the body 4, electric-power generators 3, designed for conversion of the mechanical energy produced by the wind that impinges upon the blades of the turbine into electrical energy.

In many cases, the aerogenerators 1 are moreover equipped with brakes 6, which are designed to slow down the speed of rotation of the blades 2a of the turbine 2 in the case of excessively strong wind.

Amongst the electric-power generators that are best suited to application to wind turbines are:
 induction generators, with dual supply and typically equipped with r.p.m. multipliers coupled to the shaft 7 connected to the wind turbine 2 itself; and
 direct-drive permanent-magnet synchronous generators (DDPMSGs), in this case directly coupled to the shaft of the turbine.

Illustrated in detail in FIG. 2 is a cross section of a synchronous generator 10 with permanent magnets 11, which in this case are oriented at 90° with respect to one another. The permanent magnets 11, together with the windings 12 made of conductive material wound on the permanent magnets 11 themselves, constitute the rotor 13 of the generator 10. The rotor is connected to the shaft of the wind turbine 7 and is installed inside a magnetoconductive metal stator 14, within which magnetic-field lines 15 produced by the rotor 13 are propagated during rotation.

The DDPMSG is today less widespread than the induction generator for this particular type of application. However, the DDPMSG presents certain advantages that are far from indifferent in terms of efficiency, reliability, simplicity of control and thus represents the forefront of the techniques of conversion of mechanical kinetic energy into electrical energy in the field of aerogenerators 1.

Furthermore, there are currently being developed aerogenerators 1 having a power higher than 3 MW, with a variable-speed generator connected to the 50/60-Hz public electric-power grid by means of a static frequency converter.

Today, aerogenerators 1 are typically equipped with 400-V or 690-V generators, which use dual-stage converters, with intermediate d.c. circuits, known by the acronym DCBUS, which have an output voltage typically of 650 Vdc or 1100 Vdc, are obtained with the use of insulated-gate bipolar transistors (IGBTs) and are designed to drive high voltages.

Recently, some companies have introduced a medium-voltage generator-converter system, with a concatenated voltage of 3000 Vac and 5000 Vdc on the DCBUS.

Raising of the voltage of the generator/converter is a need in order to be able to obtain large-sized aerogenerators. With a voltage of 690 V, in fact, there are conveniently obtained, given currently existing solutions, aerogenerators having powers of up to 3 MW; for higher powers, it is necessary to raise the voltage so as to improve the electrical efficiency of the system.

Aerogenerators are currently connected to the public mains grid by means of a network internal to the medium-voltage (MV) power station (where by "medium voltage (MV)" is meant a voltage in the 20-kV to 36-kV range) by means of LV-MV transformers (i.e., ones that convert the voltage from low voltage, LV, i.e., lower than 20 kV, to medium voltage, MV), which are installed inside the aerogenerator itself, and which raise the voltage to the 20-kV-36-kV level of the MV network.

The aerogenerators 1, typically located inside a wind-power plant which contains a certain plurality thereof, are then connected to the national grid via:
 1. a.c. medium-voltage distribution with a.c. medium-voltage transmission with a number of cables;
 2. distribution by means of MV/HV substations (i.e., substations for conversion from medium voltage MV to high voltage HV) on offshore platforms and transmission of the a.c. high-voltage electrical energy to the public distribution grid; and 3. medium-voltage distribution with a transmission platform with HVDC (high-voltage direct-current) transmission lines.

In all of the above three cases, the internal distribution network of the power station is once again of a medium-voltage type and, generally, the voltage of 36 kV is never exceeded within the electric-power station. However, the level of the voltage of the current-transmission lines of the wind-power plant that are connected between the aerogenerator and the ground stations of the public network is a function of the distance covered by the lines themselves; in the case where the distances are short, i.e., up to 20 km, recourse is had to the technique referred to in point 1; for distances greater than 20 km but less than 100 km, the techniques referred to in point 2 are used, with an a.c. voltage of 150 kV at 50 Hz, whilst beyond 80-100 km the techniques referred to in point 3 are used.

Current wind-power systems, however, are subject to high costs due to the amount of equipment present on the aerogenerators 1 and consequently have a considerable weight. As a result, the supporting structure and in particular the pylon must be carefully built and is very costly.

Furthermore, alternating-current systems within wind-power plants do not enable uncoupling of the wind-power plant from the electric mains network and are thus somewhat intolerant to drops in voltage, partially coming into conflict with some dispositions of European law, amongst which CEI 11-32. Alternating-current wind-power plant systems do not require voltage inverters, and this limits the capacity of production of reactive power during failures on the network so as to contribute to a fast recovery of the network.

In addition, it is known that a.c. networks are affected by the phenomenon of skin effect, whereby the electric current flows exclusively or for the most part in the outer part of the conductors, a fact that involves laborious calculations that must take into account, on the one hand, the structural strength of the electrical conductors (which consequently cannot be altogether hollow but neither can they have a diameter that is too small). It is known, in fact, that at the depth $\delta$ with respect to the outer surface of an electrical conductor, the electric-current density that traverses a conductor in sinusoidal regime is 1/e (approximately 0.37) times the current present on the outer surface.

To calculate its value, the following relation is used:

$$\delta = \sqrt{\frac{2\rho}{\omega\mu}} \quad (1)$$

where:

$\rho$ is the resistivity of a conductor (typically expressed in $\Omega mm^2/m$), $\omega$ is the angular frequency (expressed in radians per second) of the electric current, and finally $\mu$ is the absolute magnetic permeability of the conductive material (expressed in H/m or, equivalently, in $N/A^2$).

It is thus evident that the higher the network frequency, the more harmful the phenomenon is since it is possible to show that the resistance encountered by the electric current in the sinusoidal regime is proportional to the square root of its frequency. Consequently, a marked skin effect implies having a considerable ohmic loss on the network.

In such a context, the possibility of transmitting medium-voltage d.c. electrical energy can prove advantageous, enabling a reduction in the elements present inside the aerogenerator and consequently in the weights and loads supported by the supporting pylons. Not least important, the use of alternating current within the wind-power plant implies that, in the case of failure, for example, of a phase winding of a generator 3, the entire aerogenerator 1 must be put out of service because, otherwise, the waveform of the electric current generated would no longer be in consonance with the needs of the power station.

Finally, there do not currently exist medium-voltage (MV) d.c. transmission systems for covering short distances, i.e., of up to 15-20 km at the most.

The purpose of the present invention is to provide a modular system for conversion of the electric power produced by aerogenerators that will be free from the drawbacks described above.

Provided according to the present invention is a modular converter for converting the electric power produced by aerogenerators.

BRIEF DESCRIPTION OF THE DRAWINGS

The invention will now be described with reference to the annexed drawings, which illustrate a non-limiting example of embodiment thereof and in which.

DETAILED DESCRIPTION OF THE PREFERRED EMBODIMENTS

Figure 1:
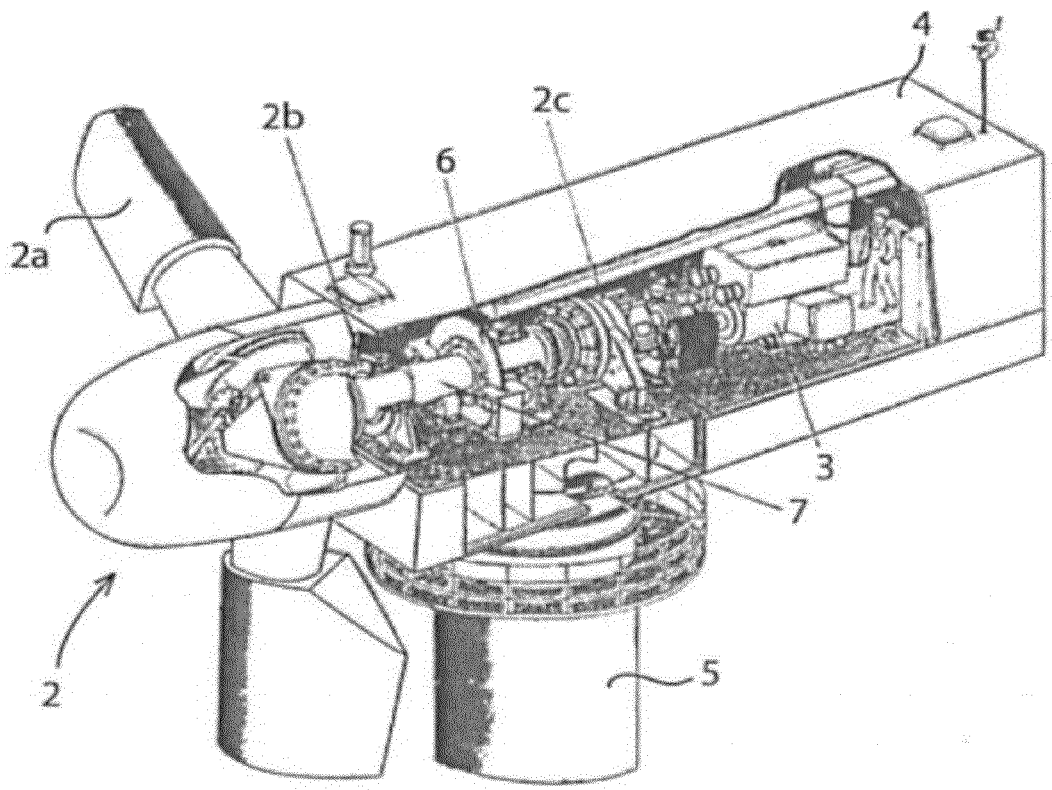
FIG. 1 is a cutaway view of an aerogenerator of a known type.
Figure 2:
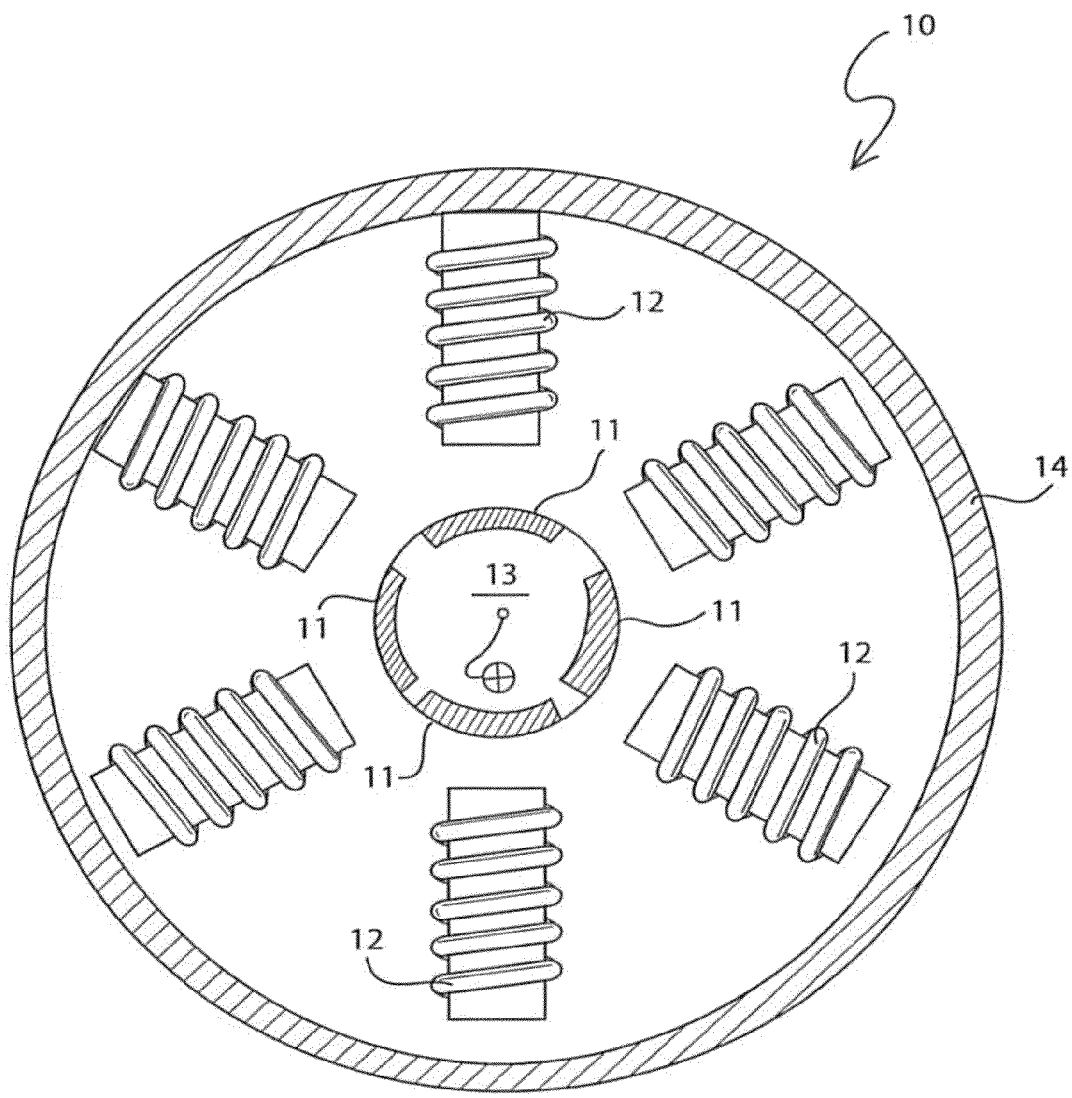
FIG. 2 is a cross-sectional view of an electric motor of a synchronous type.
Figure 3:
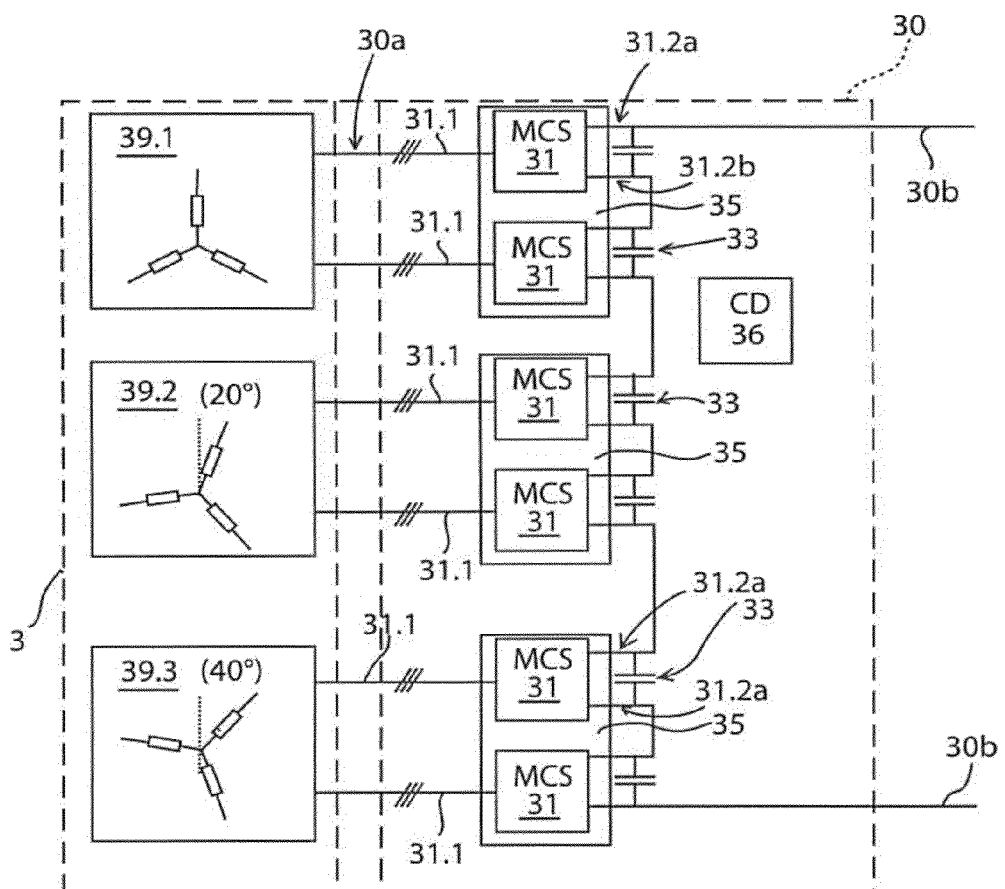
FIG. 3 represents a block diagram illustrating a possible configuration of the converter according to the present invention.

With reference to FIG. 3, designated as a whole by 30 is the multilevel modular static converter (MMSC).

The MMSC 30 comprises:

a number $N_m$ of static converter modules (hereinafter SCMs) 31, each of which is a static power converter having an a.c. input 31.1 connected to the generator 3 and a d.c. output 31.2a, 31.2b;

a digital controller (DC) 36, electrically connected to each SCM and capable of controlling the speed of rotation of the generator 3 or, alternatively, of controlling its rotational torque;

one or more inputs 30a connected directly to the inputs 31.1 of the respective SCM 31 and to the generator 3; and one or more outputs 30b that are to be connected to the public electric-power mains (not illustrated).

FIG. 3 illustrates a configuration in which there is a three-star synchronous generator 42.1, 42.2, 42.3, in which each star has two a.c. output terminals 32.4, which are each connected at input to a submodule 35 comprising two distinct SCMs 31. The two SCMs 31 forming an individual submodule 35 are connected in such a way as to have one of the two output terminals 31.2a in common. The two output terminals 31.2a and 31.2b of each individual SCM 31 are connected to a respective capacitor 33 set in parallel. The generator 3 represented in FIG. 3 is a three-star multiphase generator 42.1, 42.2, 42.3; consequently, the MMSC 30 has three submodules 35, in this case connected in series.

In general, the SCMs 31 can be configured as desired within an MMSC 30 in such a way as to obtain any one of the following configurations:
- exclusively in series;
- exclusively in parallel;
- mixed series/parallel.

Each SCM has the input 31.1 at an a.c. voltage of $V_{mac}$ and a d.c. output with nominal medium voltage $V_{dcn}$.

$N_m$ is the total number of SCMs 31 belonging to am MMSC 30, and $N_{ms}$ and $N_{mp}$ are the number of SCM converters 31 set in series and in parallel, respectively, with respect to one another; the number $N_m$ is given by:

$$N_m = N_{ms} \cdot N_{mp} \tag{2}$$

Furthermore, clearly the voltage at output from an MMSC is incremented only by the number of SCMs 31 set in series with respect to one another. Hence, denoting as $V_{dcn}$ the output voltage of an MMSC 30, we find that:

$$V_{dcn} = N_{ms} \cdot V_{mdc} \tag{3}$$

Figure 4:
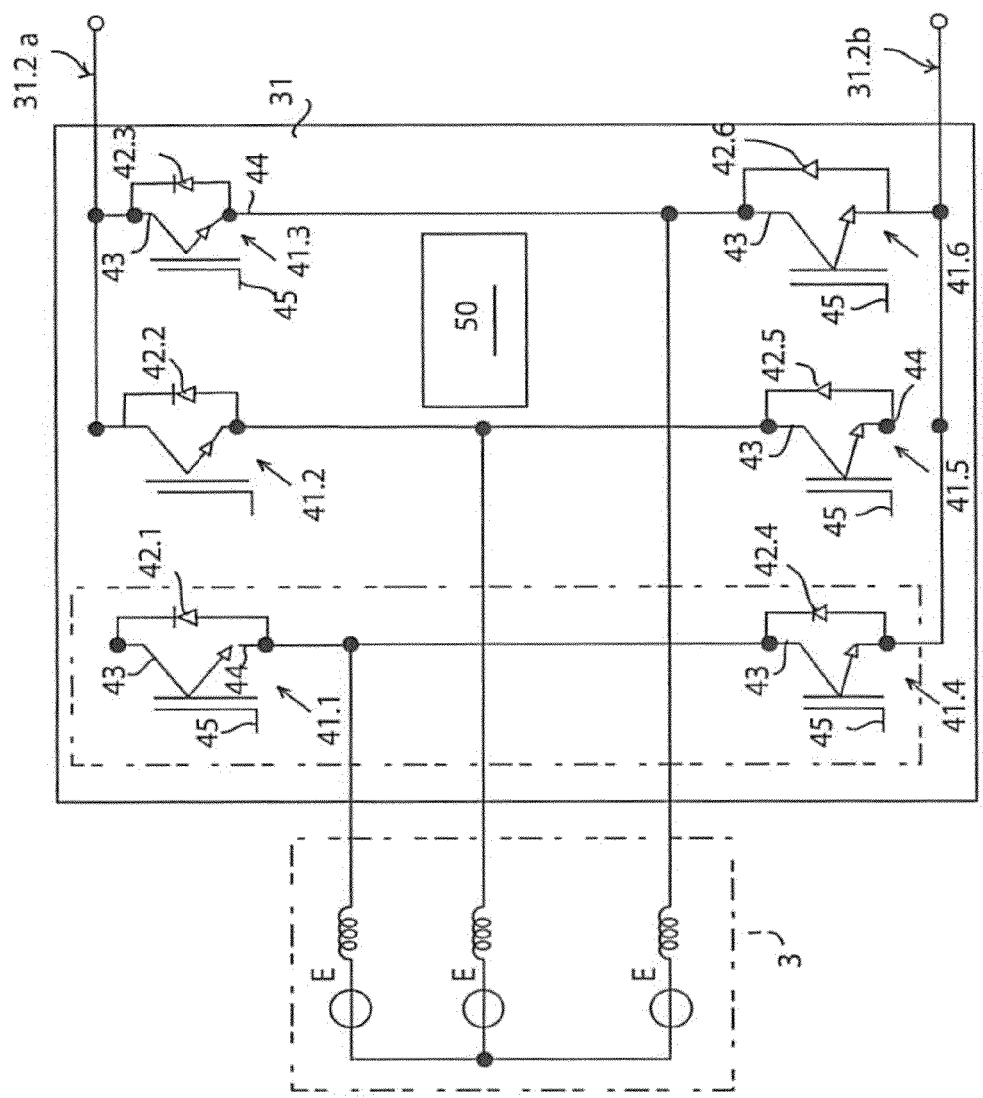
FIG. 4 is an electrical-circuit diagram of a subpart of the converter according to the present invention.

Each of the SCMs 31 is configured as a three-phase bridge inverter (three-leg inverter). FIG. 4 is, instead, a detailed block diagram of an SCM 31.

Each SCM 31 is made up of a plurality of IGBTs 41.1-41.6, each of which is equipped with a collector terminal 43, an emitter terminal 44, and a gate terminal 45. Coupled to each IGBT 41.1-41.6 is a diode 42.1-42.6, having an anode connected to the emitter terminal 44 and a cathode connected to the collector terminal 43 of the respective IGBT 41.1-41.6.

In detail, the choice to equip each MSC 31 with an IGBT is dictated by the fact that it is universally known in the art that said devices are used for switching loads with extremely high currents (even higher than 1500 A) and with very high voltages.

Represented in detail in FIG. 4 is an SCM 31 for generators 3 of a three-phase type, and consequently the SCM 31 is equipped with three pairs of IGBTs 46.1-46.3, in which each pair of IGBTs has the emitter terminal 44 of one of the two transistors connected to the respective phase of the generator 3 and to the collector terminal 43 of the other IGBT forming the pair. Each pair of IGBTs has two output terminals, which form the output terminals 31.2a and 31.2b of the SCM 31, and the pairs 46 are connected to one another in parallel.

In detail, all the IGBTs 41.1-41.6 that have the respective collector terminal 43 connected to one of the phases of the generator 3, have the respective emitter terminal 44 connected to the output 31.2b of the SCM 31; instead, all the IGBTs 41.1-41.6 that have the emitter terminal 44 connected to a phase of the generator 3 have the respective collector terminal 43 connected to the output 31.2a of the SCM 31.

Finally, each SCM 31 has a digital controller of a slave type (SDC) 50, which is controlled by the controller DC 36, thus making it possible to obtain on the generator 3 the set of the currents necessary for producing the desired electromagnetic torque and moreover keeps the d.c. output voltages of the SCMs 31 balanced with respect to one another by acting on the gate terminals 45 of each individual IGBT 41.1-41.6.

Figure 5:
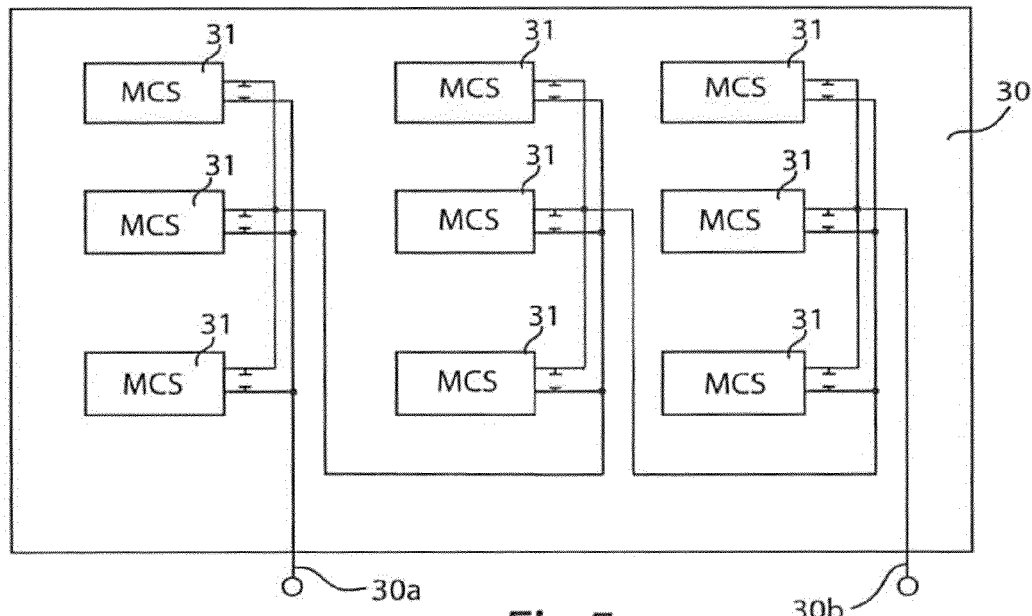
FIGS. 5 and 6 represent some possible solutions of configuration of the converter according to the present invention; and finally

Illustrated in FIG. 5 is a second example of MMSC 30, which uses nine SCMs 31 with the following configuration: three SCMs 31 in parallel, set in series to three SCMs 31 in parallel, set in series to a further three SCMs 31 in parallel. For simplicity of representation, the connections at input to each individual SCM 31 have been omitted.

With this configuration, from what has been said previously, the average d.c. nominal output voltage $V_{dc}$ across the output terminals 30a and 30b of the MMSC 30 is $V_{dcn} = 3 \cdot V_{mdc}$.

Figure 6:
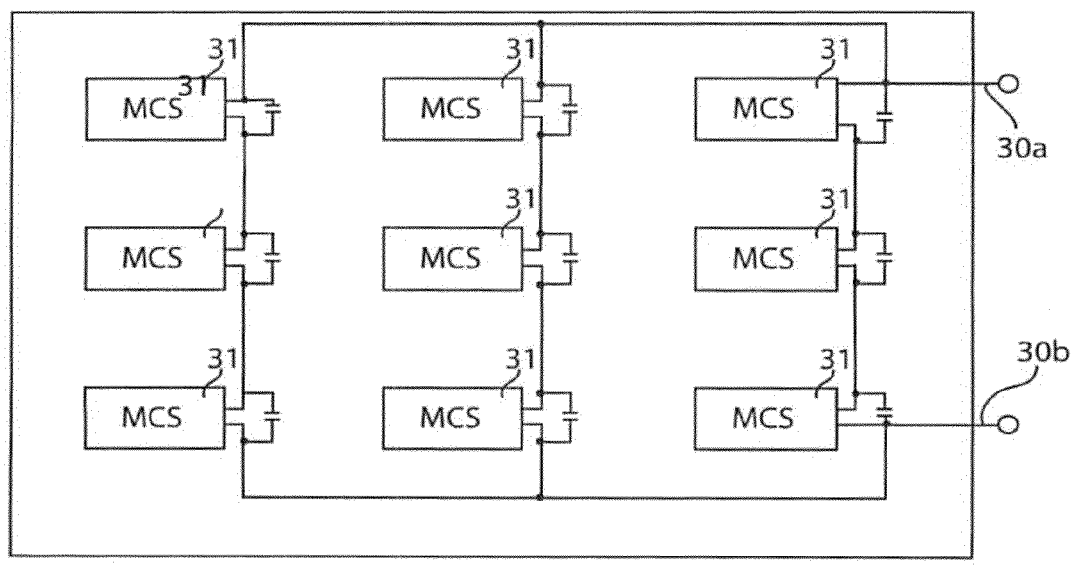

Illustrated, instead, in FIG. 6 is a further configuration of SCMs 31 inside an MMSC 30, where, even though the average d.c. nominal output voltage $V_{dc}$ across the output terminals 30a and 30b of the MMSC 30 is once again: $V_{dcn} = 3 \cdot V_{mdc}$.

Said voltage is reached by connecting in parallel three sets of SCMs 31, in which each set is formed by three SCMs 31 set in series with respect to one another.

Figure 7:
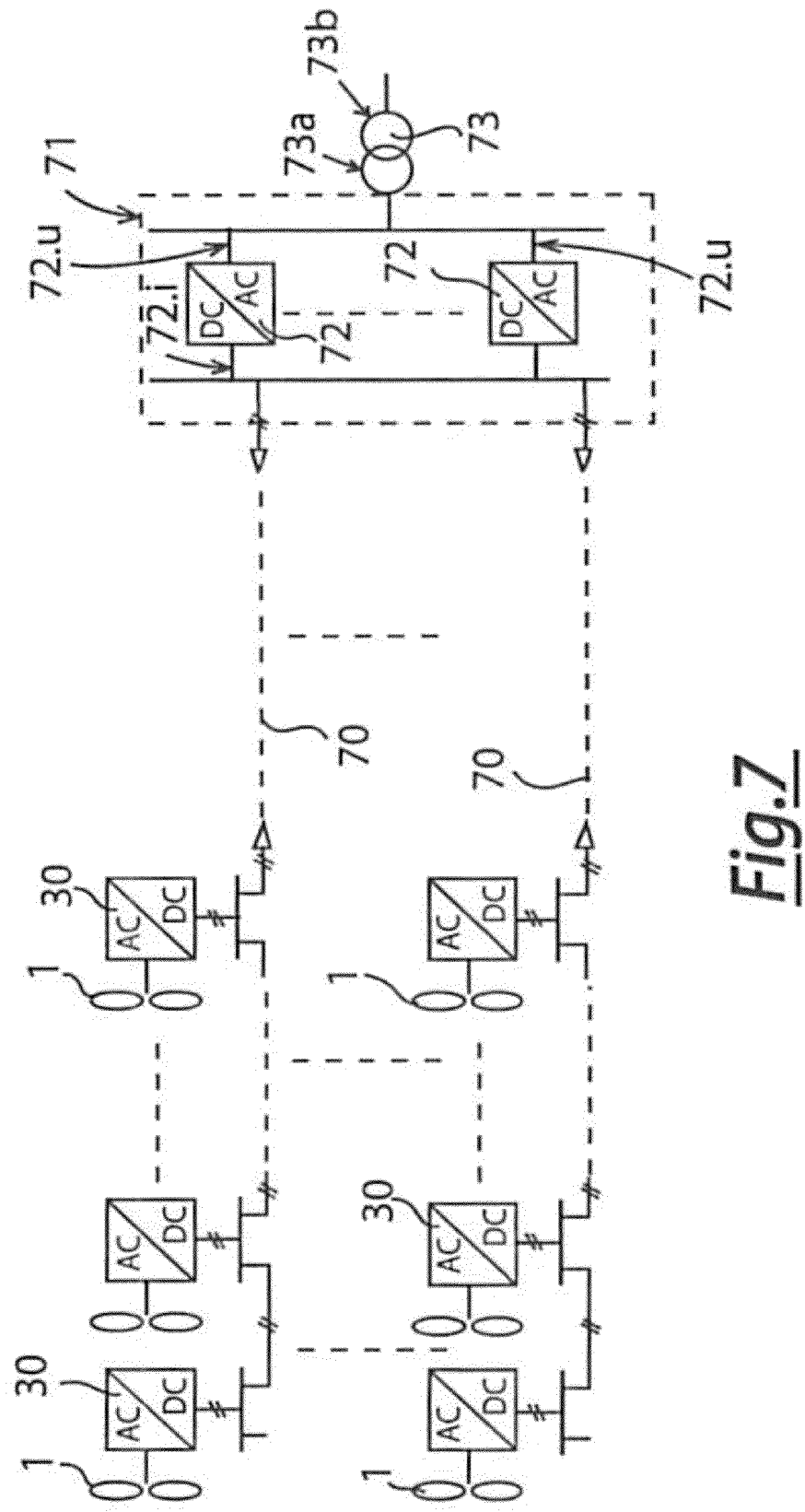
FIG. 7 is a schematic illustration of an example of wind-power plant using the converters according to the present invention.

Appearing in FIG. 7 is a block diagram illustrating in a simplified way a wind-power electric power station equipped with a plurality of aerogenerators 1 connected to a respective MMSC 30; the MMSCs 30 are connected to one another and electrically connected to the MVDC network in medium voltage (MV), represented in FIG. 7 by the lines 70, so as to supply a power equal to the sum of the individual powers generated thereby. For example, considering each aerogenerator 1 as having a power of 3 MW, and assuming connection in series of ten aerogenerators 1 for each line, the resulting power for each line 70 would be 30 MW. FIG. 7 illustrates in detail a wind-power plant in which a number of lines 70 in parallel are present.

The lines 70 of the MVDC network are connected to a d.c./a.c. electric-power conversion station 71, which also forms part of the electric-power station.

In detail, the electric-power conversion station 71 is equipped with a plurality of high-power and high-voltage voltage converters 72, which receive on their inputs 72.i the lines 70 of the medium voltage MVDC network and which each have a respective medium-voltage or high-voltage a.c. output 72.u.

Via the voltage converters 72 it is possible to obtain controlled management of the reactive power during power failures so as to contribute to a fast recovery of the network.

The voltage converters 72 are connected, on their output terminals, to a voltage-boosting transformer 73, comprising at least one primary winding 73a and one secondary winding 73b.

The voltage-boosting transformer 73 boosts the a.c. voltage supplied on its primary winding 73a in such a way as to supply a voltage on the secondary winding 73b that is considerably higher, for example 380 kV.

The advantages of the present invention described so far are clear.

In particular, the system described herein lightens the aerogenerators in as much as it is possible to eliminate from the body 4 of the aerogenerator 1 all the d.c./a.c. converters, said reduction in weight bringing about a reduction in the static and dynamic loads on the turbine, with a consequent improvement also in terms of cost of the structural elements, such as, for example, the supporting pylon 5. Furthermore, the system so far described improves the capacity of tolerance to both the internal and external failures of the electrical network in so far as the d.c. management of the network of the wind-power plant uncouples the power station itself from the network and improves its response to drops in voltage.

Thanks to the application of the d.c./a.c. inverter to the electric-power conversion station 71, it is possible to achieve an effective control of the reactive power on the network (for example, via banks of controlled-insertion capacitors or with techniques known as "closed-loop control" techniques) so as to improve and speed up the response of the wind-power plant to faults. In addition, the use of d.c. networks enables variation of the speed of rotation of each individual wind turbine, without affecting the network voltage in so far as the turbine itself is uncoupled from the MVDC network itself and is controlled by the digital controller DC.

Via the use of d.c. medium-voltage networks, it is then possible to reduce the skin-effect losses on the conductors of the electric power stations, thus enabling a reduced waste of copper for the metal current conductors, which may in fact have a considerably smaller section than in the case where they were traversed by alternating electric current. Finally, there are advantages deriving from the modular architecture. In fact, the various SCMs 31 can be easily configured with mixed in-series and in-parallel connections or, also, totally in-series or totally in-parallel configurations. In this way, the multilevel modular static converter thus enables construction of electric power stations equipped with aerogenerators of a different type, also ones having different output voltages, with considerable advantages in terms of feasibility of design of a wind-power plant and of absence of constraints of use of just one particular type of aerogenerator for each power station.

A further advantage deriving from the use of a modular architecture is that, in the case of failure on a sector of the electric-power generator 3 (for example, interruption of the cable on one of the phases) or directly of the SCM 31, there is no need for the whole aerogenerator to be put in out-of-service conditions, but it is possible to use it in any case, albeit with degraded performance.

A number of variations may be made to the system described herein: for example, it is possible to use digital controllers configured in a different way, for example not in a master-slave configuration and acting also on the very mechanics of the wind turbine, for example by varying the incidence of the blades thereof.

The invention claimed is:

1. A modular converter for converting the electric power produced by aerogenerators, for use inside a wind-power plant, comprising:
    input terminals on said modules and on said converter, configured for being connected to an electric-power generator of a single-phase or multiphase type;
    output terminals;
    a first controller for controlling the power of said electric-power generator;
    a plurality of modules receiving on inputs alternating electric current and to produce on respective outputs direct electric current to be distributed within said wind-power plant,
    said modules being configured in series to one another, wherein the input terminals of said modules are electrically connected to the input terminals of said converter;
    a plurality of insulated-gate bipolar transistors inside said modules, each of said transistors comprising a gate terminal, a collector terminal and an emitter terminal;
    each module comprising a respective secondary controller, configured to interact with said first controller and to keep the direct current voltages of the modules balanced with respect to one another, the secondary controller acting on the gate terminals of each transistor; and
    wherein said first controller receives a signal from said modules and acts on the electric-power generator.

2. The modular converter for converting the electric power produced by aerogenerators according to claim 1, wherein each module has capacitive means connected to the outputs.

3. The modular converter for converting the electric power produced by aerogenerators according to claim 1, wherein coupled to each of the bipolar transistors is a respective rectifying diode connected between the collector terminal and the emitter terminal of the respective bipolar transistor.

4. The modular converter for converting the electric power produced by aerogenerators according to claim 1, wherein the bipolar transistors are arranged in pairs, each pair having two bipolar transistors, wherein the collector terminal of one of the two bipolar transistors forming said pair is connected to the emitter terminal of the other bipolar transistor forming said pair and to one of the phases of said electric-power generator so that for each pair there is connected a different phase of said electric-power generator.

5. The modular converter for converting the electric power produced by aerogenerators according to claim 4, wherein all the bipolar transistors having the respective collector terminal connected to a phase of said electric-power generator have the respective emitter terminal connected to the output of said module and, respectively, all the bipolar transistors having the respective emitter terminal connected to a phase of said electric-power generator have the respective collector terminal connected to said output of said module.

6. The modular converter for converting the electric power produced by aerogenerators according to claim 1, wherein said modules are designed to receive on their respective inputs the a.c. electrical energy coming from an electric-power generator of a synchronous type.

7. A wind-power plant comprising:
    a plurality of aerogenerators, which have a wind turbine, a support, and a body, inside which an electric-power generator is connected to said wind turbine through a shaft;
    an internal network for carrying electrical energy; and
    an electric-power conversion station, connected upstream to said internal network;
    wherein on the internal network, direct current electrical energy is carried, wherein for each aerogenerator there is present a modular converter comprising a controller and a plurality of modules connected in series and configured to receive an alternating electric current on inputs and to produce on outputs direct electric current to be distributed inside said wind-power plant, and wherein said controller receives an electric control signal from said modules and on the electric-power generator controls the speed or torque of the electric-power generator, and each of said modules comprises a slave controller keeping said output of each of said modules balanced with respect to the other modules wherein a plurality of insulated-gate bipolar transistors inside said modules, each of said transistors comprising a gate terminal, a collector terminal and an emitter terminal.

8. The wind-power plant according to claim 7, wherein downstream of said electric-power conversion station is directly and electrically connected a transformer, designed to boost the voltage that arrives on the inputs; and wherein said electric power station further comprises a plurality of insulated-gate bipolar transistors inside the modules, each of the transistors comprising a gate terminal, a collector terminal and an emitter terminal.

9. The wind-power plant according to claim 7, wherein each module of said modular converter has capacitive means connected to the outputs.

10. The wind-power plant according to claim 7, wherein coupled to each of the bipolar transistors is a respective rectifying diode connected between the collector terminal and the emitter terminal of the respective bipolar transistor.

11. The wind-power plant according to claim 7, wherein the bipolar transistors are arranged in pairs, each pair having two bipolar transistors, in which the collector terminal of one of the two bipolar transistors forming said pair is connected to the emitter terminal of the other bipolar transistor forming said pair and to one of the phases of said electric-power generator so that for each pair there is connected a different phase of said electric-power generator.

12. The wind-power plant according to claim 11, wherein all the bipolar transistors having the respective collector terminal connected to a phase of said electric-power generator have the respective emitter terminal connected to the output of said module and, respectively, all the bipolar transistors having the respective emitter terminal connected to a phase of said electric-power generator and having the respective collector terminal connected to said output of said module.

13. The wind-power plant according to claim 1, wherein each module comprises a respective secondary controller, designed to interact with said controller and to keep the output voltages of the modules balanced with respect to one another by acting on the gate terminals of each individual transistor.

14. The modular converter according to claim 1, wherein said electric-power generator is a synchronous electric-power generator, of a three-phase type or with a higher number of phases.

* * * * *